United States Patent
Kuniansky

(10) Patent No.: US 9,665,340 B2
(45) Date of Patent: May 30, 2017

(54) SYSTEMS AND METHODS FOR TEMPORARILY SHARING AUDIO OVER A NETWORK

(71) Applicant: Daniel Ryan Kuniansky, Atlanta, GA (US)

(72) Inventor: Daniel Ryan Kuniansky, Atlanta, GA (US)

(73) Assignee: Daniel Kuniansky, Atlanta, GA (US)

(*) Notice: Subject to any disclaimer, the term of this patent is extended or adjusted under 35 U.S.C. 154(b) by 114 days.

(21) Appl. No.: 14/512,555

(22) Filed: Oct. 13, 2014

(65) Prior Publication Data

US 2016/0103652 A1    Apr. 14, 2016

(51) Int. Cl.
| | | |
|---|---|---|
| *G06F 17/00* | (2006.01) | |
| *G06F 3/16* | (2006.01) | |
| *H04L 29/08* | (2006.01) | |
| *H04L 29/06* | (2006.01) | |
| *G06F 21/10* | (2013.01) | |

(52) U.S. Cl.
CPC ............. *G06F 3/165* (2013.01); *G06F 21/10* (2013.01); *H04L 63/061* (2013.01); *H04L 63/123* (2013.01); *H04L 65/00* (2013.01); *H04L 67/06* (2013.01); *G06F 2221/0788* (2013.01); *G06F 2221/2137* (2013.01)

(58) Field of Classification Search
CPC . G06F 21/10; G06F 21/105; H04L 2463/101; H04L 2209/603; H04L 67/104; H04N 21/2541; H04N 21/25875; H04N 21/26613
See application file for complete search history.

(56) References Cited

U.S. PATENT DOCUMENTS

| | | | |
|---|---|---|---|
| 2004/0117663 A1* | 6/2004 | Colvin | G06F 21/121 726/30 |
| 2008/0133551 A1* | 6/2008 | Wensley | G06F 21/10 |
| 2010/0274848 A1* | 10/2010 | Altmaier | H04L 67/104 709/203 |
| 2013/0097644 A1* | 4/2013 | Brande | H04N 21/6408 725/93 |
| 2014/0046955 A1* | 2/2014 | Dollard | G06Q 30/0251 707/748 |

* cited by examiner

*Primary Examiner* — Thomas Maung
(74) *Attorney, Agent, or Firm* — Clayton, McKay & Bailey, PC

(57) ABSTRACT

Systems and methods presented herein may allow a sending user to stream audio to recipients without providing a permanent audio file, facilitating sharing of audio while retaining control over the audio file and reducing the chances of users copying the file. The sending user may specify number of plays, duration of time audio will be available for streaming, and the number of times the audio can be re-shared in one embodiment. The sending user and recipients may all execute a common client software on their computing devices that causes the computing devices to delete the audio when the streaming is complete and detect attempts to copy the audio at the device.

19 Claims, 7 Drawing Sheets

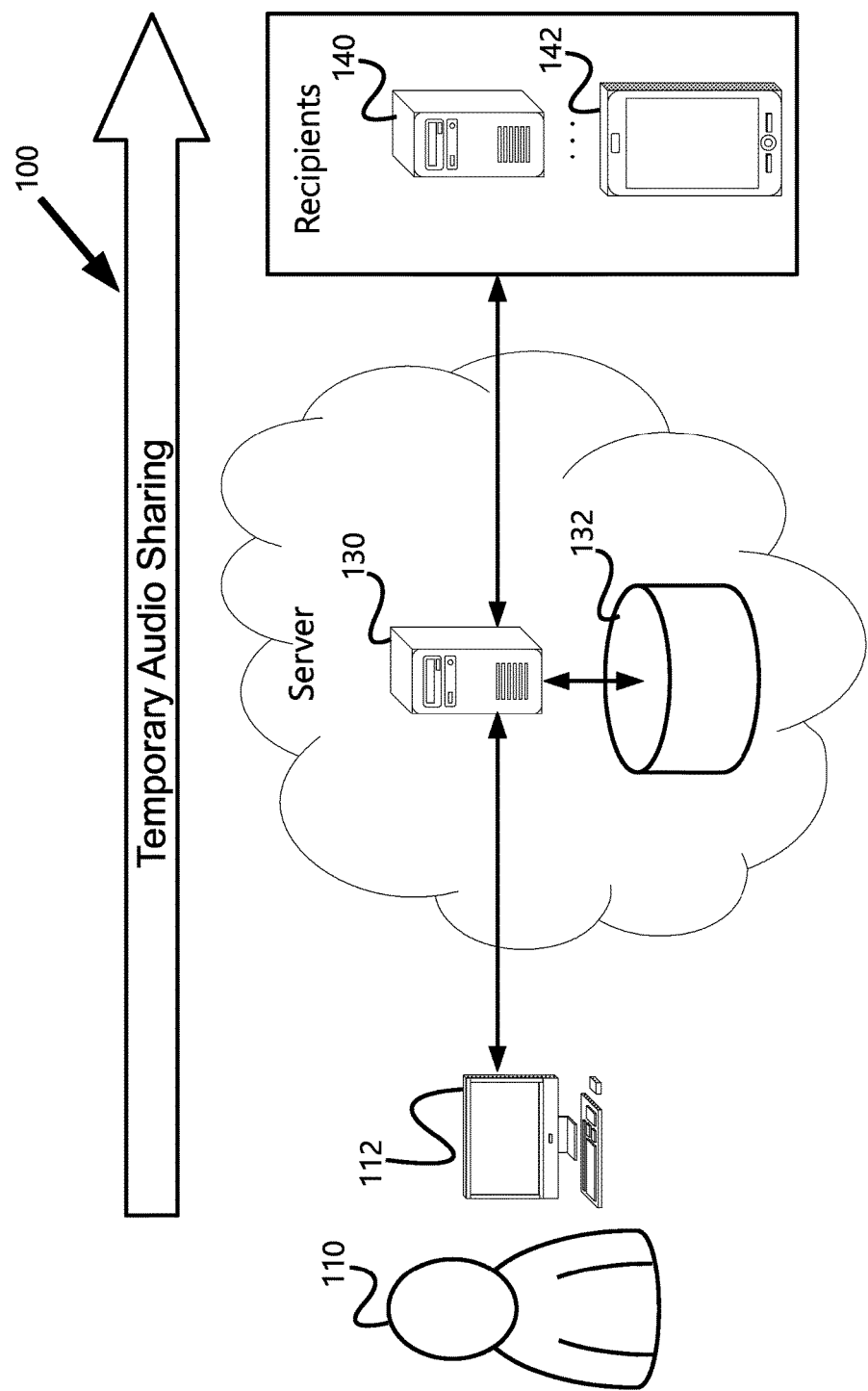

SYSTEMS AND METHODS FOR TEMPORARILY SHARING AUDIO OVER A NETWORK

DESCRIPTION OF THE EMBODIMENTS

Field of the Embodiments

The embodiments relate generally to systems and methods for temporarily sharing audio over a network, and, more specifically, to systems and methods for sharing audio with users without allowing the audio to be copied or recorded.

Background

People typically share audio files by attaching them to an email and sending them to another person. This has several shortcomings. First, the act of attaching and emailing the audio file can be cumbersome, particularly when multiple recipients are needed. Not only does the user have to locate the email address of each recipient, but some email accounts have file size limitations that may block the email. This is because the size of audio files can range wildly based on file type. For example, a .WAV may be 40 MB whereas a .MP3 file of the same audio may be 5 MB. Additionally, the length of the audio directly impacts the size of the audio file(s).

Second, sharing audio in this manner can have other problematic effects when the copyright owner of the audio wishes to control its dissemination. This is because an audio file is permanent and can be easily replicated, allowing any recipient to pass a copy of the audio file onward any number of times. The music industry in particular constantly is on guard against this, both with released and unreleased music.

Music files that are in production may be passed around for input from the artist(s), the producer(s), the record label executives, and any number of other advisors. This can result in many copies of an otherwise unreleased audio track. All too often, someone will gain access to the unreleased audio and post it on the Internet, leaking the song before the artist or record label intended, often negatively impacting potential sales.

Therefore, a need exists for systems and methods for temporarily sharing audio over a network, and, more specifically, to systems and methods for sharing audio with users without providing a permanent audio file to the user.

SUMMARY

Embodiments described herein include systems and methods for temporarily sharing audio over a network. In one embodiment, a system for temporarily sharing audio may include a first device and a second device, each including a processor and circuitry for connecting to a network that includes an Internet, and a non-transitory computer readable medium containing instructions that are downloaded and executed by at least the first and second devices. The system may also include a server in communication with at least the first and second devices over the Internet.

The server may perform stages that include receiving, from the first device, an audio sharing request constructed based on the first device executing the downloaded instructions, the audio sharing request including: (1) an identification of an audio file; (2) a first restriction on how long the file will be available for listening; (3) a second restriction on the number of times a user may listen to the audio; and (4) a first selection of recipients that includes a recipient user associated with the second device.

Based on this sharing request, the server may send a first playback message to the second device and each recipient in the first selection of recipients that has a computing device that has downloaded the instructions, wherein the playback message includes a unique key for each selected recipient and an option to playback at least a portion of audio associated with the audio file.

In response, the server may receive a communication from the second device, the communication being in response to the playback request and based on the second device executing the instructions to create the communication, wherein the communication includes the key received as part of the playback message. The server may use the received communication to check a database based on the key to determine if the second device can stream audio associated with the audio file, and if the verification is made, stream the audio associated with the audio file to the second device.

The second device may monitor whether any attempt is made to record the audio on the second device during streaming, and if so, notify the server to end the streaming. The server may then report the attempt to the sender associated with the first device.

The server may also automatically delete the audio file based on the first restriction.

Various options for restricting playback may be available to the sender. For example, in one embodiment, the sharing selections may include a number of times a recipient user may listen to the audio. In another embodiment, the sharing selections may include a start date and/or time for when the audio file will be available to a plurality of users in the recipient selection. In a further embodiment, the sharing selections include a selection of an audio watermark to be blended into the translated stream format, which may help the user track a leaked audio track based on a unique aural watermark that is placed in the audio.

In yet another embodiment, the user may select a subset of the audio file to stream by adjusting boundaries on a visually presented representation of an audio waveform associated with the audio file.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 2A is an exemplary illustration of a system for temporarily sharing audio over a network, in accordance with an embodiment;

DESCRIPTION OF THE EMBODIMENTS

Reference will now be made in detail to the present exemplary embodiments, including examples illustrated in the accompanying drawings. Wherever possible, the same reference numbers will be used throughout the drawings to refer to the same or like parts.

Temporary Audio Sharing Summary

Exemplary embodiments herein allow a user to transmit and share audio with an audience such that the audio is not saved locally on the recipient's computing device and limited to a sender-determined number of playbacks and/or duration where playback is available. When the playback criteria is no longer met, the audio automatically becomes inaccessible. The audio may be a song, a portion of a song, an audio book, or any other audio that the user may wish to temporarily share.

A system herein may, for example, allow a musician to share a song preview with his or her fans with the track being spread across the Internet for everyone to download. It may also allow an artist or producer to send a demo track to multiple potential producers or record label representatives without fear that the recipient may then pass the track to others who may copy or leak the audio without permission.

In addition, the user may be able to send audio to the recipient(s) without providing the entire file, which may demand less Internet bandwidth at any one time.

The user may also select restrictions around the sharing of their audio, such as what portion of the audio to share, the number of listens permitted for a recipient, whether the recipient can re-share the audio with others and how many times, and how long the audio will be available for listening to. The user may also conveniently create a recipient list (i.e., intended audience) by linking the system to social media accounts, phone contact lists, email lists, and other preexisting contacts.

As used herein, the term "audio file" may refer to any digitally-stored audio regardless of format, including .WAV, .AIFF, .MP3, SDII, AC3, DSD, or any number of audio file formats. The digital audio file can even include at least an audio portion of a video file type, such as .AVI, to the extent that the video file type includes an audio track or portion. Further, the audio file may be a voice message created by the sending user, for example, to send spontaneous voice messages or other audio to friends.

As used herein, the term "audio associated with the audio file" may refer to the same information contained in the audio file or instead a representation of at least a portion of that audio information. For example, audio streamed at a different bit rate or sample rate for a thirty-second portion of the audio file would be considered audio associated with the audio file.

Exemplary System and Environment Overview

Figure 1:
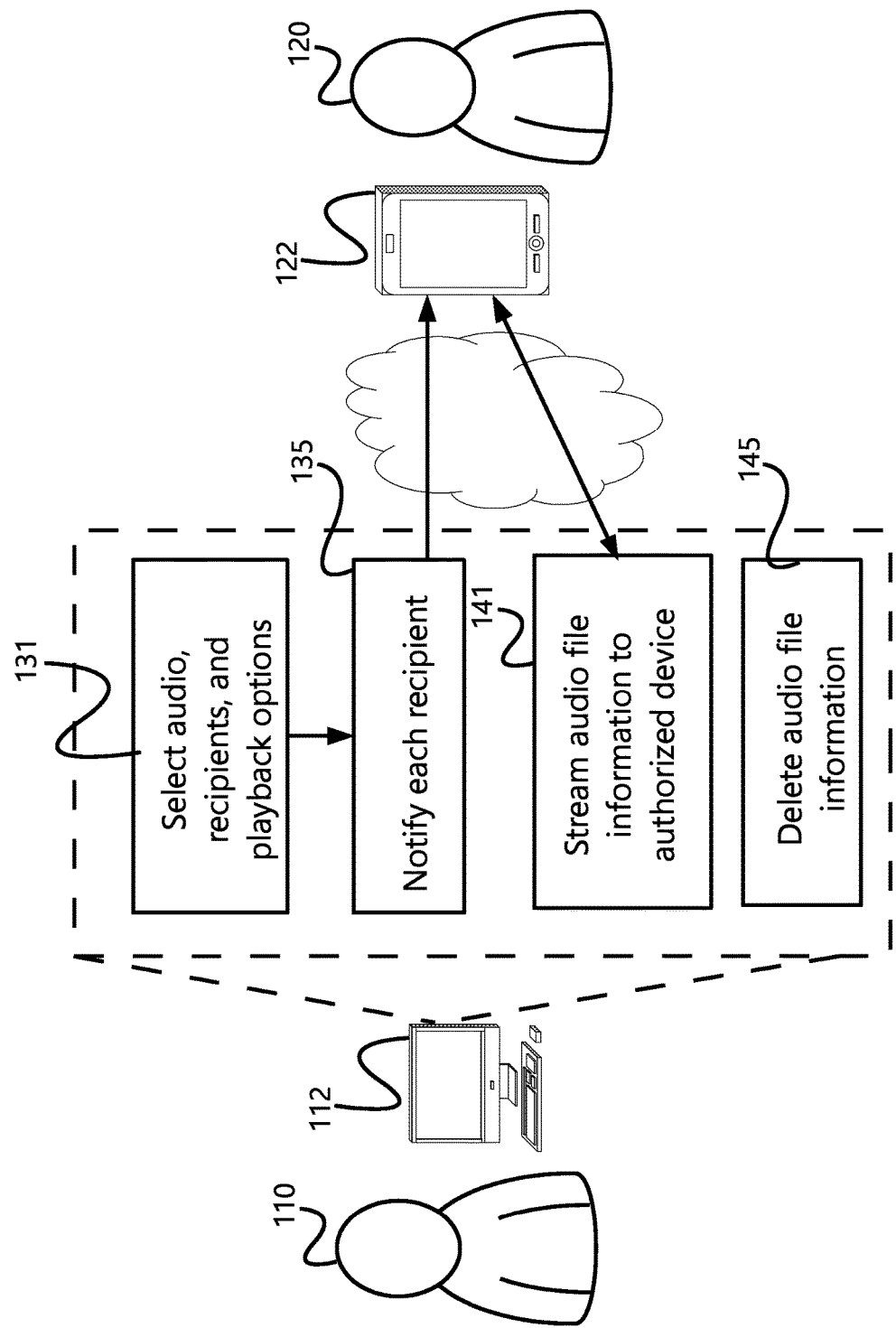
FIG. 1 is an exemplary illustration of a system for temporarily sharing audio over a network, in accordance with an embodiment.

FIG. 1 shows an exemplary illustration of a simplified system for temporarily sharing audio, in accordance with an embodiment. In this example, a user (i.e., sender) 110 at a first computing device 112 may attempt to temporarily share an audio file, such as a song he or she recorded, with at least one audience member, such as recipient 120. The computing device 112 may include a computer-readable medium containing instructions that are executed by a processor in the computing device 112, causing the computing device 112 to carry out stages necessary to temporarily share audio associated with the audio file. Additionally, the recipient 120 may also be using a second computing device 122 that may also be executing the instructions and provide a means to receive and listen to the audio associated with the audio file.

Each computing device 112 or 122 may be any processor- or controller-based device for displaying, storing, receiving, and transmitting information. For example, computing device 112 can be a cell phone, smart phone, tablet, laptop, personal computer, or television. Other examples of computing device 112 include any portable or non-portable, processor- or controller-based device. Additional example computing devices 112 are discussed below, and any device capable of displaying the content discussed herein is contemplated.

In one embodiment, at stage 131 the software executing on the first computing device 112 may allow the user 110 to select the audio that the user 112 wishes to share. For example, the user 110 may be presented with a graphical user interface ("GUI") that includes various options for selecting an audio file and specifying various restrictions on how that audio file may be consumed by one or more recipients. In another embodiment, "selecting the audio" may include recording a voice message in real time for transmission out to one or more recipients.

In one embodiment, the GUI may be presented as part of an application that resides and runs on the first device 112. In another embodiment, the GUI may at least partially be executed based on a connection with a network server, for example, in a software as a service (SAAS) implementation. For example, the GUI may be accessed by logging into a website in one embodiment. In another embodiment, both a local application and a website are options that the user may choose from when setting up an audio sharing request.

The GUI may allow the user 110 to select a list of intended recipients in one embodiment, such as by selecting a friends list or particular friends from the list. In another embodiment, the GUI may import the user's 110 phone contact list as potential recipient options. In still another embodiment, the GUI may import users from a social network account, such as FACEBOOK or TWITTER.

At stage 131 the user 110 may also select playback options (e.g., restrictions) in one embodiment. The playback restrictions may include (1) a time limit on how long the audio will be accessible, (2) the number of times a recipient 120 may listen to the audio, (3) start and end points in the audio (i.e., selecting only a portion of the audio for playback), (4) sending to phones only and disabling speaker phone usage, (5) specifying when the audio will begin being available for streaming, (6) specifying a number of additional users that the recipient may invite to listen to the audio (i.e., a re-share limit), (7) placing an aural (audio) watermark into the audio, and (8) only sending to users who are below a threshold number of past recording attempts.

At stage 135, the user 110 may send a playback message to the recipient 120 along with any other recipients selected by the user 110. In one embodiment, the system is a peer-to-peer system where device 112 directly notifies each recipient device 122 by sending the playback message over a network, such as the Internet or LTE cell network. In another embodiment, a server notifies each recipient device 122.

The notification may also coordinate with social media messaging in one embodiment, such as posting to FACEBOOK if a FACEBOOK friends list is utilized to create the recipient list.

At stage 141, each recipient 120 may then accept the playback message and begin streaming the audio associated with the audio file to their respective device 122. The streaming may be limited based on the above-mentioned selectable playback restrictions, and as discussed in more detail below. The streaming may be carried out such that no recipient device is ever in possession of the full audio file in one embodiment, such as by streaming portions of audio based on receiving notification from the recipient device 122 that at least one earlier portion has been deleted. In one peer-to-peer embodiment, multiple peers may retain segments of the overall audio in order to piece together streaming sources for the full audio that does not rely on the user's 110 computing device 112 being online.

In another embodiment, a video clip or additional audio clip selected by the sending user may play before the audio file streams. For example, the user may record a short video clip explaining or introducing the audio file, and may choose to have the introduction clip play before the audio file.

At stage 145, the audio associated with the audio file or even the audio file itself may be deleted, in accordance with an embodiment. For example, a server-based embodiment may delete the audio file after a user-specified amount of days or time has elapsed, which may help guard against attempts to hack the software and illegally obtain the audio file. Additionally, Exemplary Server-Based System Turning to FIG. 2A, an exemplary system 100 for temporarily sharing an audio file through use of an intermediate server 130 is shown. In this example, the user 110 may use his or her computing device 112 to share audio by uploading the audio to a server 130 for distribution.

Server 130 may comprise one or more servers. For example, server 130 may include a plurality of servers located all over the world at locations convenient for streaming to devices in particular geographic locations. For simplicity, FIG. 2A illustrates only one server, but embodiments with multiple servers for one or more of the entities are contemplated.

The computing devices 112, 140, and 142 may each still utilize system 100 software locally on the respective device to execute audio sharing and listening functionality in an embodiment. The software may include a set of instructions stored remotely on a computer-readable medium 132. Each user may access the instructions, such as over the Internet, downloading them to the respective computing device 112, 140, and 142 for local execution. Execution of these instructions by the sender may allow the sender's user device 112 to coordinate with server 130

Continuing with FIG. 2A, the user's 110 sharing (e.g., recipient selections) and playback restriction selections may be sent to server 130, which builds and sends the actual playback message (invitation) that gets sent to at least some of the selected recipient devices 140 and 142.

In one embodiment, the server 130 may first build a representation of the audio in one embodiment that is optimized for streaming. For example, the server 130 may adjust the file type to a smaller storage format in one embodiment. The file type may be adjusted to a file type that is intended only to be played by executing the audio sharing software at the recipient device 140 and 142 in one embodiment, to better monitor recipient playback and guard against duplication or recording. In one embodiment, the server 130 may continually change a playback criteria for the proprietary file type, causing client software at recipients 140 and 142 to update periodically to further prevent hacks to the client software that could compromise the ability to prevent recording or duplication of the audio.

The server 130 may store the audio representation of the audio file locally, such as at computer-readable medium 132, which may be a database in one embodiment.

Then the server 130 may contact the recipients by notifying recipient devices 140 and 142 of the ability to listen to the audio. In one embodiment, the server may check a database to determine if recipient devices 140 and 142 are running the most recent software version for the audio sharing client and, if not, first notify the recipient devices 140 and 142 of the need to update the client software. For example, the existing client software executing on the recipient device 140 may create a message that says "Someone wants to share a file with you. Upgrade your client to the latest version to find out more." By requiring the latest version of the client, the system may be less vulnerable to hacking or other recording attempts. The latest version may be downloadable from a network location linked in the message or internally known by the client software in one embodiment.

The server 130 may send a playback request to a recipient device 142 that is running the latest version of the client software. The recipient user may click a button to begin playing the audio, which may initiate a streaming sequence with the server 130.

In one embodiment, the playback request contains a unique key for each recipient device 140 and 142 to assist in tracking playback iterations for each recipient and for protecting against non-recipient users from playing the audio, for example, by following a single link or encrypted path to gain access.

The unique key may identify the playback device 142 and be provided back to the server 130 along with other information relevant to playback. For example, a recipient device 142 may report a device type (e.g., phone, personal computer, etc.), a geographic location, a software version identifier, and user login information. The user login information may be compared with the unique key to verify the recipient, which may allow for multiple different users to use a single device 142 without the server 130 treating them as a single user. The server 130 may also verify that the software version is the latest version. These verifications may include the processor causing queries to run against a database to make sure the system records align with the information received from the recipient device 140.

The database may also track the number of plays for each recipient user, and first determine that the maximum number of plays specified by the sharing user 110 has not been reached by that recipient before streamlining the audio to the recipient device 142.

The database may also utilize the keys to limit and track re-shares, which may allow a recipient to share the audio with a limited number of their friends who were not already recipients selected by the sending user. When the sender so allows, this may allow the sender to reach a broader audience and potentially gain followers, fans, or friends. The new sub-recipients may be handled by the server 130 similarly to the chosen recipients, by tracking the number of plays. Also, the server 130 may not allow another level of re-shares, meaning that the sub-recipients may not further share the audio in one embodiment.

If server 130 verifications are successful, in one embodiment the server 130 then begins streaming the audio associated with the audio file to the recipient device 142. This may be done in a sequence of segments. For example, after the server 130 sends first and second audio segments to the recipient device 142, the server 130 may wait for the device 142 to notify the server 130 that the first segment has been deleted before sending a third audio segment, and so on.

In another embodiment, the audio streams to the recipient device and may collect in full there, but the local client deletes the audio after a period of time slightly longer than the audio itself. For example, for a three minute song, the audio may be deleted after three minutes and ten seconds. In still another embodiment, the audio may remain at the receiving device 142 until the maximum number of plays have been reached, at which time it is automatically deleted. In yet another embodiment, small pieces of the audio information necessary for playback are kept at server 130 and are retrieved at each play attempt and used by the recipient device 142 through execution of the local client to decode the audio file for each local playback.

Example Safeguards Against Unauthorized Audio Recording or Duplication

The system may include multiple technologies to guard against copying and/or recording of the temporarily-shared audio, in addition to those already mentioned above. Example preventative techniques may include (1) monitoring activity at the recipient device 142 and reporting recording attempts to the sending user 110, (2) limiting sound output to particular device types and/or particular output options at the recipient device, (3) unique key and software version verification, (4) aural watermarking, (5) incorporating audio file types native only to the system, (6) staggered streaming, and (7) denying streaming of the audio to certain recipients based on past detected recording attempts by those recipients. These safeguards are exemplary and non-limiting, and are discussed below in turn.

First, the client software of system 100 may monitor activity at the recipient device 142 to prevent and report recording attempts. For example, if a user attempts to turn on a microphone or recording software, the client software may terminate playback and/or streaming. It may also report the recording attempt to server 130, which may relay the report to the sending user's 110 device 112.

In another embodiment, the client software of system 100 may limit playback features or hardware at the recipient device 142 to prevent recording attempts. For example, playback via the client may automatically disable any microphone hardware and/or recording software executing on the recipient device 142. This may prevent the recipient from utilizing an audio recording application while the client is streaming the audio from the server 130. The client may disable these features by sending commands to applicable hardware found in the system registry in one embodiment, or to known integrated hardware for a known device type (e.g., for a phone). The client may disable, for example, Bluetooth connectivity during playback in one embodiment.

The client software may also limit playback to built-in speakers in one embodiment, if specified by the sending user 110. For example, the sending user 110 may limit playback to only phone type computing devices 142, and require that only the non-speaker-phone operation may be used. This may make it difficult for the recipient to use a separate external device to record the audio during playback while still allowing the recipient user to listen to a low-quality version of the audio.

In one embodiment, the recipient device is a cell phone and the client software may utilize a camera or face sensor on the client device to ensure that the user's ear is next to the speaker. If the user is not listening, the audio file may not stream.

As mentioned previously, the server 130 may generate a unique key for each recipient. The unique key may be generated based on the audio information and user information associated with the recipient device 142. Thus, each different audio file may have a different set of keys, allowing the server 130 to accurately track playback of each audio file by each recipient user.

In another embodiment, the server may build the audio representation of the audio file with an aural watermark included. This aural watermark may be different for each recipient in one embodiment, and include a recipient user name in one embodiment. For example, a machine voice pronouncing the user name may repeat within the audio representation of the audio file. When the recipient listens to the audio, the aural watermark may be present at a low level in the background. This may deter copying, because the source of the copied file will be apparent based on the watermark, opening up the copying user to applicable punishments under the law.

The file type may be adjusted to a file type that is intended only to be played by executing the audio sharing software at the recipient device 140 and 142 in one embodiment, to better monitor recipient playback and guard against duplication or recording. In one embodiment, the server 130 may continually change a playback criteria for the proprietary file type, causing client software at recipients 140 and 142 to update periodically to further prevent hacks to the client software that could compromise the ability to prevent recording or duplication of the audio.

In another embodiment, the server 130 may stagger segments that are streamed to the user, such that a new segment is only sent upon receiving an indication that an earlier segment has been played back and deleted.

In still another embodiment, the server 130 may track attempts by users of the system 100 to record audio, and deny streaming of the audio to certain recipients based on numbers of past detected recording attempts by those recipients. For example, if a recipient has already attempted to record audio twice, that recipient may be unable to receive the audio if the sender has elected to screen for infraction thresholds. Such past infractions may be forgiven over time, such as every two months in one embodiment.

Exemplary Distributed System

Figure 2B:
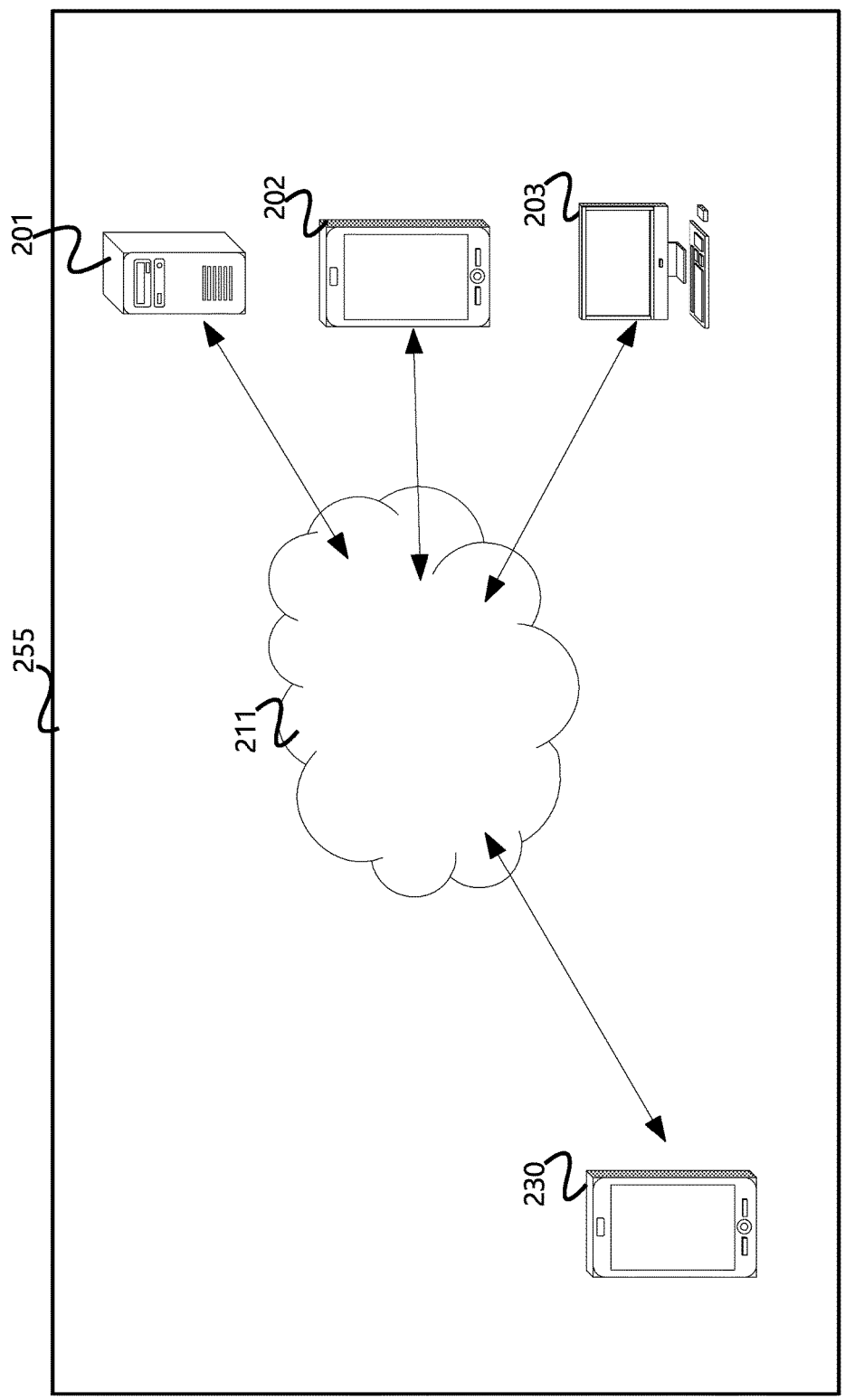
FIG. 2B is an exemplary illustration of a system for temporarily sharing audio over a network, in accordance with an embodiment.

FIG. 2B presents an exemplary illustration of a distributed audio sharing system 200 in which multiple devices 201, 202, and 203 receive shared audio from a sending device 230 without a server. Each device 201, and 202, and 203 may also be in communication with other devices having a common audio sharing authorization in one embodiment.

Instead of relying on a central server, the devices may build a shared stack of information regarding the temporary audio that is sent from the sharing device 230, and synchronize over a network 211, such as the Internet, to stream portions of the audio a device 202 that seeks to listen to the audio and is within the restrictions set at the sending device 230.

For example, the sending device may send an option to listen to an audio stream to each of devices 201, 202, and 203. The users of those devices may respectively elect to listen to the audio. For example, a user of device 201 may elect to listen to the audio, at which time software executing on the device 201 may attempt to open a stream of a first portion of the audio.

To decrease the bandwidth necessary to share the audio with a large audience, in one embodiment, the server may convert the audio file to a new sample rate and/or bit rate through and provide clock frequency information with the audio stream for appropriate playback. For example, a 44.1 kHz rate may be converted to 22 kHz in one embodiment, which may decrease the amount of bandwidth needed to share the audio. The sample rate may indicate the number of samples per second used in a digital representation of an audio signal, whereas the bit rate may indicate the number of bits used to represent the level of the sample. In theory, the higher the sample rate and bit rate, the closer a discrete digital audio file represents the continuous analog audio signal that it emulates, but the more data must be transmitted to stream the audio over the network.

In one embodiment, the client software running on each computing device 201, 202, and 203 may communicate playback to other devices, which check to make sure the device 202 is not able to extend playback capability past the restrictions set by the sending user. These checks can include verifying software build dates and versions in one embodiment. Because at least a portion of the audio must always be streamed from another device in the network, the devices collectively may count the number of plays and once the maximum number has been reached, the device 203 making that determination may send a message to the device 202 that has reached the maximum, and the software executing on that device 202 may block the device 202 from making further playback requests.

Similar functionality to that already explained with regard to a server embodiment may be implemented in a distributed embodiment by including the same sorts of functionality in the client software that executes on each device 201, 202, 203, and 230.

Exemplary System Hardware Components

Figure 3:
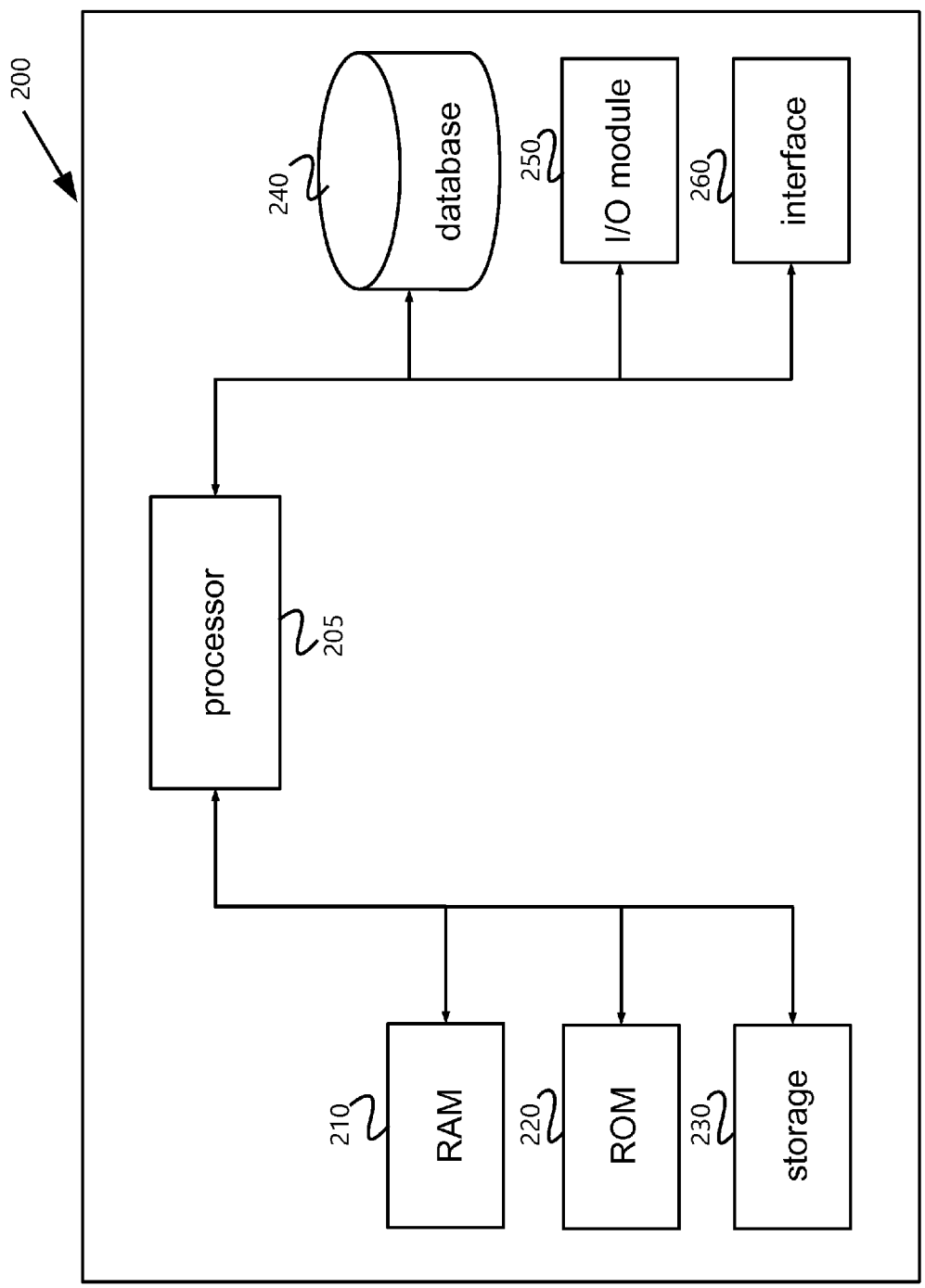
FIG. 3 is an exemplary illustration of example components utilized a system for temporarily sharing audio over a network, in accordance with an embodiment.

FIG. 3 depicts an exemplary processor-based computing system 200 representative of the type of computing system that may be present in or used in conjunction with a server 130 or device 112, 140, or 142 of either FIG. 2A or 2B. Continuing with FIG. 3, the computing system 200 is exemplary only and does not exclude the possibility of another processor- or controller-based system being used in or with one of the aforementioned components. Additionally, a sharing user device 112 or recipient user device 140 need not include all the system hardware components in an embodiment.

In one aspect, system 200 may include one or more hardware and/or software components configured to execute software programs, such as software for storing, processing, and analyzing data. For example, system 200 may include one or more hardware components such as, for example, processor 205, a random access memory (RAM) module 3210, a read-only memory (ROM) module 220, a storage system 230, a database 240, one or more input/output (I/O) modules 250, and an interface module 260. Alternatively and/or additionally, system 200 may include one or more software components such as, for example, a computer-readable medium including computer-executable instructions for performing methods consistent with certain disclosed embodiments. It is contemplated that one or more of the hardware components listed above may be implemented using software. For example, storage 230 may include a software partition associated with one or more other hardware components of system 200. System 200 may include additional, fewer, and/or different components than those listed above. It is understood that the components listed above are exemplary only and not intended to be limiting.

Processor 205 may include one or more processors, each configured to execute instructions and process data to perform one or more functions associated with system 200. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 2A, processor 205 may be communicatively coupled to RAM 210, ROM 220, storage 230, database 240, I/O module 250, and interface module 260. Processor 205 may be configured to execute sequences of computer program instructions to perform various processes, which will be described in detail below. The computer program instructions may be loaded into RAM for execution by processor 205.

RAM 210 and ROM 220 may each include one or more devices for storing information associated with an operation of system 200 and/or processor 205. For example, ROM 220 may include a memory device configured to access and store information associated with system 200, including information for identifying, initializing, and monitoring the operation of one or more components and subsystems of system 200. RAM 210 may include a memory device for storing data associated with one or more operations of processor 205. For example, ROM 220 may load instructions into RAM 210 for execution by processor 205.

Storage 230 may include any type of storage device configured to store information that processor 205 may need to perform processes consistent with the disclosed embodiments.

Database 240 may include one or more software and/or hardware components that cooperate to store, organize, sort, filter, and/or arrange data used by system 200 and/or processor 205. For example, database 240 may include user-specific account information, predetermined menu/display options, and other user preferences. Alternatively, database 240 may store additional and/or different information. Database 240 may also contain a plurality of databases that are communicatively coupled to one another and/or processor 205, which may be one of a plurality of processors utilized by server 130.

I/O module 250 may include one or more components configured to communicate information with a user associated with system 200. For example, I/O module 250 may include a console with an integrated keyboard and mouse to allow a user to input parameters associated with system 200. I/O module 250 may also include a display including a graphical user interface (GUI) for outputting information on a monitor. I/O module 250 may also include peripheral devices such as, for example, a printer for printing information associated with system 200, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 260 may include one or more components configured to transmit and receive data via a communication network, such as the Internet, a local area network, a workstation peer-to-peer network, a direct link network, a wireless network, or any other suitable communication platform. For example, interface 260 may include one or more modulators, demodulators, multiplexers, demultiplexers, network communication devices, wireless devices, antennas, modems, and any other type of device configured to enable data communication via a communication network.

GUI Example

Figure 4:
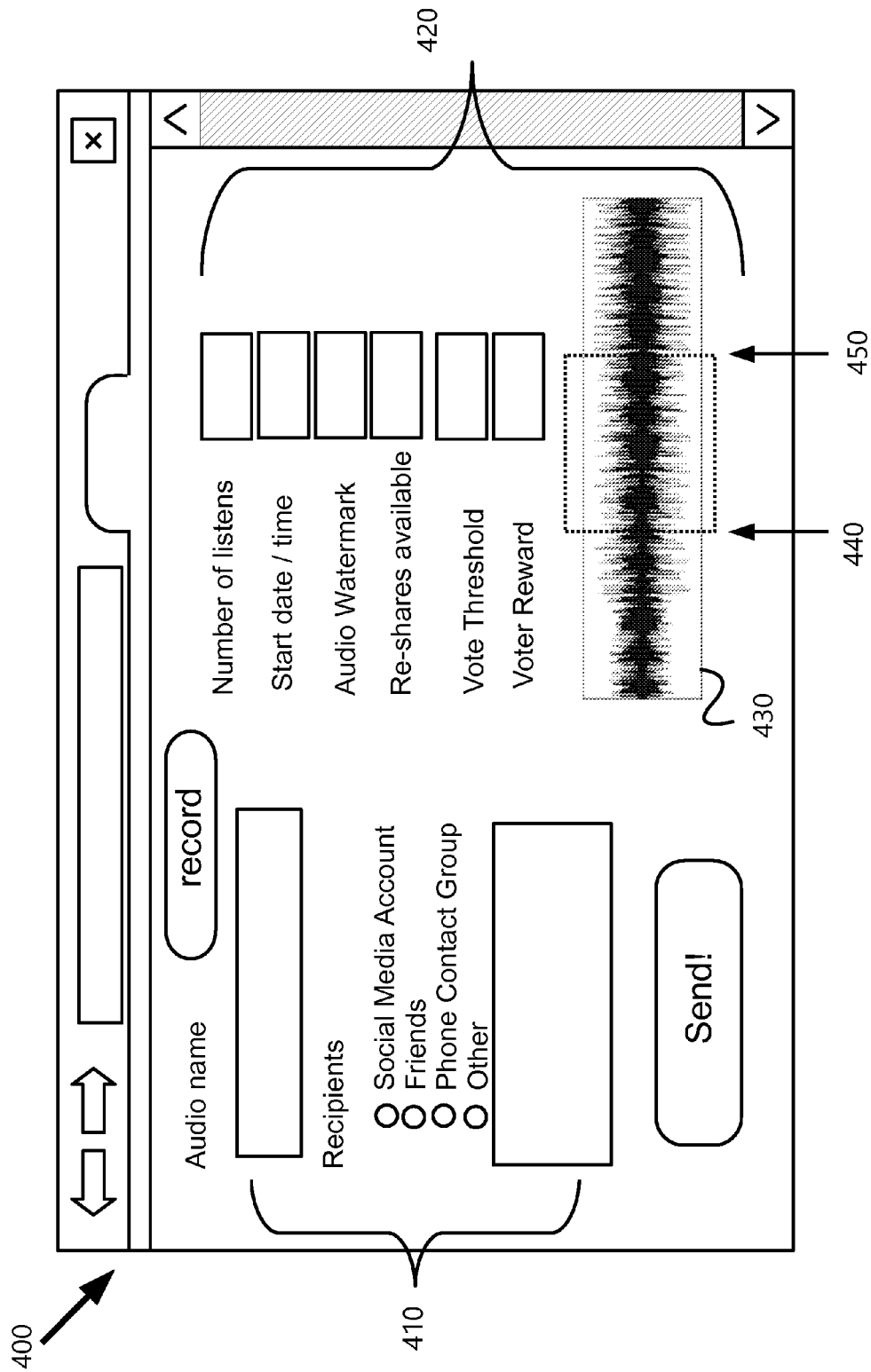
FIG. 4 is an exemplary illustration of a webpage interface that may be incorporated in a system for temporarily sharing audio over a network, in accordance with an embodiment.

Turning now to FIG. 4, an exemplary illustration of a browser displaying a webpage 400 GUI on the display 300 of a computing device (such as computing device 112 of FIG. 2A) is shown. Although this example utilizes a webpage 310 for illustration purposes, similar functionality and presentation may be accomplished with a localized application GUI running as part of the client software.

In this example, several options are presented for potential selection by a sending user. Generally, options 410 relate to audio and recipient selection, whereas options 420 may relate to restrictions placed on playback, many of which have been explained above.

Notably, this example GUI 400 includes a visual representation of the audio file 430, and allows the user to select start 440 and end 450 points in the audio file 430 to define the start and stop points in the audio that will be temporarily shared. In this way, the sending user may define only a portion of the audio that gets shared by the server or the distributed system, such as by dragging the start and stop boundaries to the desired locations.

Voting Features and Sharing Thresholds

In one embodiment, the system further allows recipients to rate an audio file, and then performs some additional reward action based on a rating threshold being met. The rating may be provided as a thumbs up or thumbs down in one embodiment, or alternatively as a numerical score in another embodiment. The rating option may be presented when the audio finishes streaming, such that the recipient must listen to the audio file before being given an opportunity to rate the audio file. The rating option may be displayed on a GUI at the user's device, such that the user may make selections as part of the same GUI that allows the user to listen to the audio.

In one embodiment, this may cause the recipient device to contact the server to communicate the rating. The server may include a storage medium that stores ratings of the audio file by at least a portion of the plurality of recipients. The ratings may be received by the communications interface at the server then processed and categorized by the processor.

In another embodiment, the processor may determine if the stored ratings meet a sharing threshold. For example, the sharing user may set an audio file to become available for permanent download after a threshold number of positive votes have been received. In another embodiment, the file is only made permanently available to a portion of recipients, such as the voting recipients, upon the threshold being met.

In another embodiment, the software may allow a recipient to preorder the audio file after listening to it. The number of preorders may be tracked similarly to votes at the server. Once a threshold number of preorders have been received, the server may then release the track for download to all recipients that preordered the track, sending the users a message to notify them that the preordered track is available.

Retrieving votes and/or preorders may also allow the server to track information about who likes the audio. For example, the server may be able to track data related to who, what, when, and where in terms of the recipients. For example, the server may be able to use the votes to determine a geographic area, such as a particular collection of states, where the audio is relatively more popular. This data may allow the sending user to better plan promotional activities and radio circulation emphasis.

Example Flow Charts for Temporarily Sharing Audio Information

Figure 5:
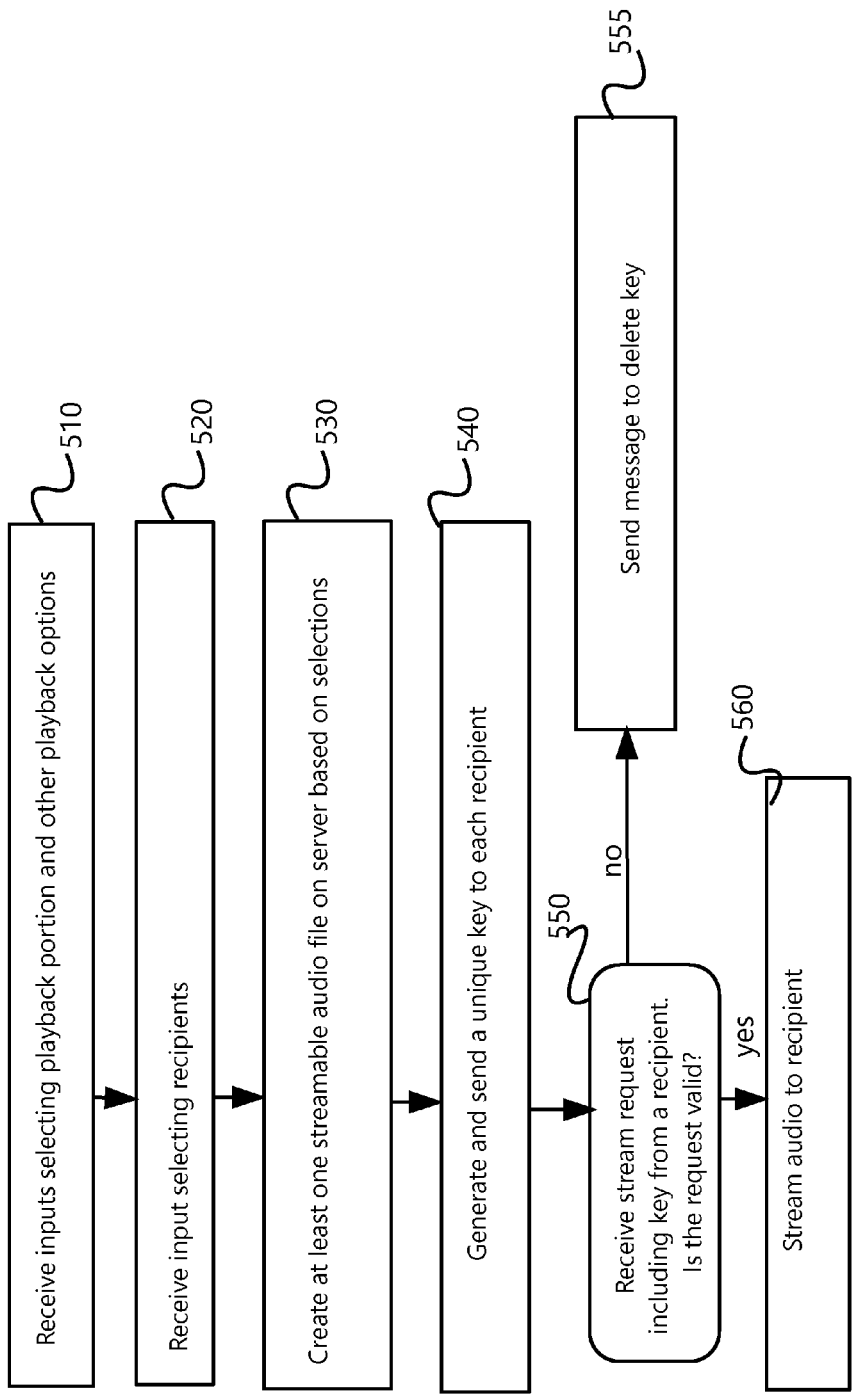
FIG. 5 is an exemplary flow chart with non-exhaustive listings of steps that may be performed by a server, in accordance with an embodiment.

FIG. 5 shows an exemplary flowchart of steps performed by a plurality of distributed devices 112 and/or a server 130 to temporarily share audio information with an audience (i.e., a plurality of recipient devices), in accordance with an embodiment. Although these steps may be described with reference to a server, it is contemplated that the steps may be substantially performed in a distributed server-less system as well.

At step 510, the server or device may receive inputs from a sending user that select a portion of an audio file for playback and other playback options, such as any of the restrictions on recipient playback discussed herein.

At step 520, the server or device may receive inputs regarding the recipients that the user wishes to share the audio with. These selections may be received by a server at the same time as the selections in step 510 in one embodiment.

At step 530, the server or device may create at least one streamable audio file based on the selections received in steps 510 and/or 520.

At step 540, the server or device may send a playback message to the recipients chosen in step 520. The playback message may include a unique key for each recipient based on both the audio information and the recipient information.

At step 550, the server or a device may receive a stream request from a recipient, including a unique key as part of the request. The server or device may then attempt to verify that the key is valid and has not used up all of the allotted listens for that recipient. If this verification cannot be made (or if the number of listens have already been exhausted), then at step 555 the server or device causes the recipient device to delete the key and any remaining related audio in one embodiment.

Otherwise, at step 560, the server or device may stream portions of the audio to the recipient.

Further Exemplary Flow Chart for Client Execution

Figure 6:
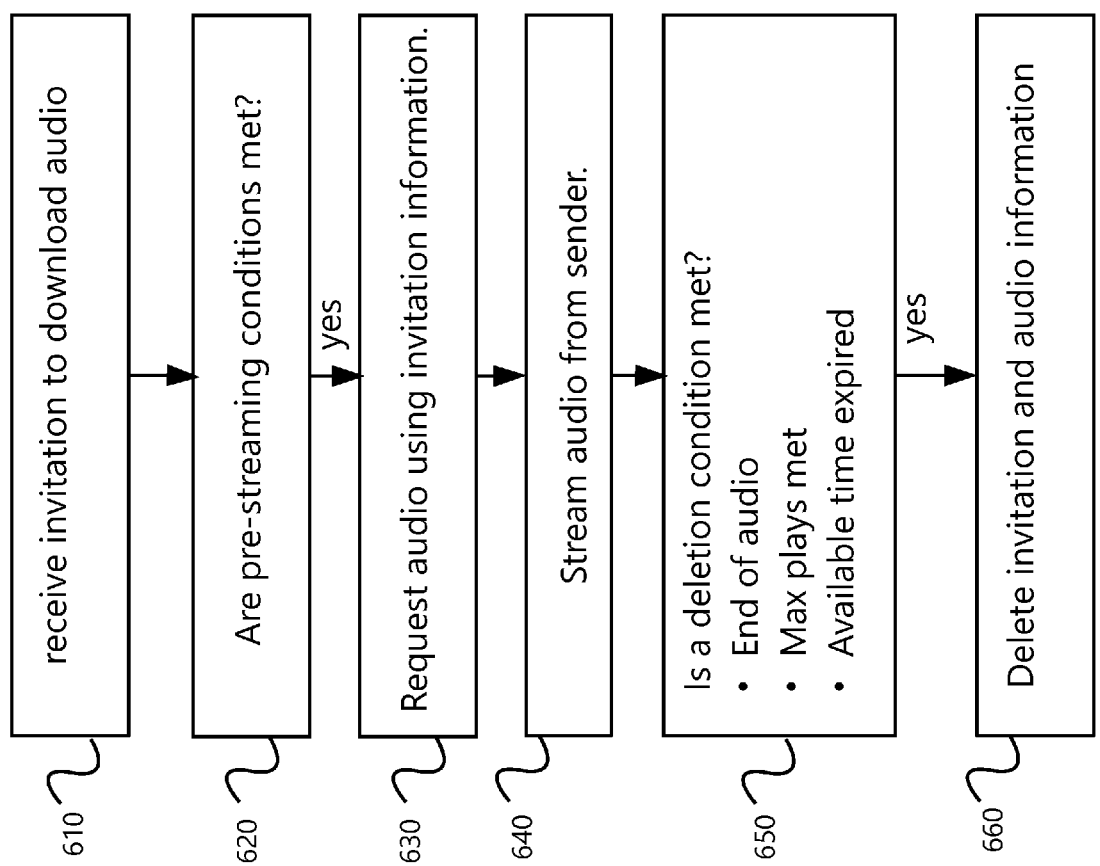
FIG. 6 is an exemplary flow chart with non-exhaustive listings of steps that may be performed by a recipient computing device, in accordance with an embodiment.

Turning to FIG. 6, additional exemplary steps performed are illustrated that client software may execute to temporarily receive audio, in accordance with an embodiment.

At step 610, the recipient device may receive an invitation to download audio.

At step 620, the client may cause the recipient device to check if pre-streaming conditions are met. For example, the device may check with the server or another device to determine if the audio is still available, if the device is of an authorized device type, or other verification items already discussed herein.

If the pre-streaming conditions are met, then at step 630 the client may cause the recipient device to request audio using information in the invitation, such as a unique key. In one embodiment, step 630 is performed as part of step 620.

At step 640, the device may stream audio from a plurality of other devices, or in a server-centric embodiment, from the server. The client may monitor whether the recipient user is attempting to record the audio, and alert the sender accordingly.

At step 650, the client determines if any condition has been met that would require deletion of the audio stored locally. In one embodiment, the audio is deleted once playback has stopped. In another embodiment, the device deletes local audio information once a maximum number of plays have been met. In yet another embodiment, the client causes the device to delete the audio information after a certain amount of time has elapsed.

The deletion may occur at step 660. In one aspect, the device deletes the file by writing new placeholder information (i.e., otherwise meaningless ones and zeroes) at a storage address associated with the audio information.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for temporarily sharing audio, the system comprising:
   a non-transitory computer-readable medium containing instructions;
   a communication interface that receives a selected audio file and sharing selections that are selected by a sending user regarding the sharing of that audio file, the sharing selections including:
      a recipient selection of a plurality of recipients with permission to listen to the selected audio file,
      a first input limiting a duration that the audio file is available for listening, and
      a second input limiting a number of the plurality of recipients listening to the audio file; and
      a third input limiting a number of times a recipient user may listen to the audio; and
   a processor in communication with the interface and the computer-readable medium, wherein the processor executes the instructions to perform stages including:
      translating the audio file into a stream format;
      sending a message to a first recipient user included in the recipient selection regarding listening to audio associated with the audio file;
      receiving a request from a first user device of the first recipient user to listen to the audio associated with the audio file;
      verifying the first recipient user can listen to the audio by at least:
         receiving a unique key from the user;
         verifying a software client version based on the unique key and requiring an update to a latest software version; and
         checking a database for at least one record regarding a listening history of the recipient user to determine if the recipient user is below a threshold number of past unauthorized recording attempts;
      in response to the verification, sending a first portion of the audio to the user, wherein a second portion of the audio is sent to the user in response to a threshold number of positive votes being received for the first portion; and
      automatically deleting the audio file after a predetermined period of time and based on the duration selected by the first input and the number of times selected by the third input being exceeded.

2. The system of claim 1, further including a storage medium that stores ratings of the audio file by at least a portion of the plurality of recipients that are received by the communications interface; and
   wherein the processor further performs stages including:
      determining if the stored rating meets a sharing threshold; and
      in response to determining that the threshold is met, causing the audio file to be available for download by the portion of the plurality of recipients.

3. The system of claim 1, wherein the sharing selections include a selection of an audio watermark that is blended into the audio file in the translated stream format.

4. The system of claim 1, where the processor stages further include:
   receiving a notification from the first user device to terminate streaming based on a recording attempt at the first device; and
   notifying the sending user that the first user device attempted to record the audio.

5. The system of claim 1, wherein the communication interface includes a graphical representation of the audio file, and wherein the user may select the first portion of the audio file by moving boundaries on the graphical representation, the selected portion being part of the sharing selections,
   wherein the audio associated with the audio file is limited to the selected portion.

6. The system of claim 1, wherein the recipient selection automatically pulls recipient contacts from an account associated with the sending user, the account being chosen from a group that includes a social media account, a phone contact group, or a friends list.

7. A non-transitory computer-readable medium containing instructions that, when executed by a processor, cause the processor to perform steps including:
   receive, via an interface, selections from a sending user including:
      a first input selecting a plurality of recipients;
      a second input selecting at least a portion of an audio file to make available to the plurality of recipients for listening;
      a third input limiting a duration that the audio file is available for listening;
      a fourth input limiting a number of times a recipient user may listen to the audio;
   in response to the sending user selections:
      creating a streamable audio file that is stored locally to the processor;
      creating a unique key for each recipient and sending the respective unique key to each recipient, including a first key that is sent to a first recipient within the plurality of recipients;
      receiving a first stream request from the first recipient to play the audio file, the request including the first key and an identifier of a client software version being run by the first recipient and requiring an update to a latest software version;
      verifying that the first recipient can listen to the streamable audio file by comparing the first key to a locally-stored verification key, checking the identifier, and determining if the recipient user is below a threshold number of past unauthorized recording attempts;
      in response to the verification, streaming at least a first portion of the streamable audio file to a first device associated with the first recipient, wherein a second portion of the audio is streamed to the first device in response to receiving a threshold number of positive votes; and
      deleting the verification key based on the duration selected by the third input and the number of times selected by the fourth input being exceeded.

8. The computer-readable medium of claim 7, wherein steps further include:
   receiving a notification from the first device to terminate streaming based on a recording attempt at the first device; and
   notifying the sending user that the first device attempted to record the audio.

9. The computer-readable medium of claim 7, wherein the selections further include a fifth input that disables speaker phone functionality during playback on the first device.

10. The computer-readable medium of claim 7, wherein the selections from the sending user include a selection of an aural watermark to be blended into the translated stream format.

11. The computer-readable medium of claim 7, wherein the selections from the sending user include a selection of the number of times the recipient user may share the audio with another user that is not part of the recipient selection.

12. The computer-readable medium of claim 7, wherein the second input includes a selection of a portion less than the full audio file, wherein the selection of the portion is made by the sending user moving boundaries on a graphical representation of an audio wave,
   wherein the streamable audio file is limited to the selected boundaries.

13. A system for sharing audio, the system including:
   a first device and a second device, each including a processor and circuitry for connecting to a network that includes an Internet;
   a non-transitory computer readable medium containing instructions that are downloaded and executed by at least the first and second devices;
   a server in communication with at least the first and second devices over the Internet, the server performing stages that include:
      receiving, from the first device, an audio sharing request constructed based on the first device executing the downloaded instructions, the audio sharing request including:
         an audio file;
         a first restriction on how long the file will be available for listening;
         a second restriction on the number of times a recipient user may listen to the audio; and
         a first selection of recipients that includes the recipient user associated with the second device;
      sending a first playback message to the second device and each recipient in the first selection of recipients that has a computing device that has downloaded the instructions, wherein the playback message includes a unique key for each selected recipient;
      receiving a communication from the second device, the communication being in response to the playback message and based on the second device executing the instructions to create the communication, wherein the communication includes the key received as part of the playback message;
      verifying a software client version based on the key and requiring an update to a latest software version; and
      checking a database based on the key to determine if the second device can stream audio associated with the audio file based on whether a second user associated with the second device is below a threshold number of past unauthorized recording attempts;
      streaming, to the second device, a first portion of the audio associated with the audio file, wherein a second portion of the audio is streamed to the second device in response to the server receiving a threshold number of positive votes regarding the first portion;
      deleting the audio file based on the first and the second restriction.

14. The system of claim 13, the stages performed by the server further including creating the audio associated with the audio file by building a file for streaming that represents only the first portion of the audio file.

15. The system of claim 13, wherein the server determines the portion of the audio file based on criteria received as part of the audio sharing request, wherein the criteria is selected by a user of the first device based on the first device executing the instructions to present a visual representation of the audio file that allows the users to specify boundary regions within the visual representation, and wherein the server determines the start and stop points of the streamed audio based on the boundaries.

16. The system of claim 13, wherein the selection of recipients is generated at least in part based on the user of the first device identifying a pre-existing friends list that includes contact information.

17. The system of claim 13, wherein the server sends a second playback request to a second set of recipients determined from a share request received from the second device that references the streamed audio.

18. The system of claim 13, wherein the server checks a version of the instructions operating on the second device before authorizing streaming the audio to the second device.

19. The system of claim 13, wherein the instructions cause the second device to monitor for an audio recording activity on the second device while the audio is streaming to the second device, and send a message to terminate streaming upon detection of the audio recording activity.

* * * * *